(12) United States Patent
Yeh

(10) Patent No.: US 6,261,125 B1
(45) Date of Patent: Jul. 17, 2001

(54) EXTENSION HOUSING FOR RF MULTI-TAP

(75) Inventor: Tony Yeh, Taipei (TW)

(73) Assignee: Lantek USA, LLC, Englewood, CO (US)

( * ) Notice: Subject to any disclaimer, the term of this patent is extended or adjusted under 35 U.S.C. 154(b) by 0 days.

(21) Appl. No.: 09/208,059

(22) Filed: Dec. 9, 1998

Related U.S. Application Data

(60) Provisional application No. 60/069,149, filed on Dec. 9, 1997.

(51) Int. Cl.[7] .................................................. H01R 9/05
(52) U.S. Cl. .............................................................. 439/579
(58) Field of Search ............................. 439/579; 333/260

(56) References Cited

U.S. PATENT DOCUMENTS

| | | | |
|---|---|---|---|
| 3,374,449 | * | 3/1968 | Moore et al. . |
| 3,676,744 | * | 7/1972 | Pennypacker ............................ 174/59 |
| 3,845,454 | * | 10/1974 | Hayward et al. . |
| 5,505,636 | * | 4/1996 | Blum ...................................... 439/579 |
| 5,788,535 | * | 8/1998 | Stinsky et al. ........................ 439/578 |
| 5,906,512 | * | 5/1999 | Reynolds .............................. 439/579 |

\* cited by examiner

*Primary Examiner*—Neil Abrams
(74) *Attorney, Agent, or Firm*—John E. Reilly

(57) ABSTRACT

An extension housing (C) for a cable TV multi-tap device is made up of extension tubes (A) in coaxially aligned relation to one another for the purpose of providing wider bandwidth subscriber multi-taps with a longer extension coaxial connector to span the distance between a TV coaxial cable ends without affecting performance. An RF signal connector (H) is inserted in each tube having a dielectric insulator (D) at one end, an elongated conductor (15) having a bore (17) extending through its greater length and longitudinally split segments (14) surrounding the bore for insertion of a conductor pin (10) extending from a cable connector at the end of the extension tube and inserted through the dialectric insulator into the bore and a second conductor pin (16) extending from the elongated conductor into contact with a face plate connector (G) in the housing. In one form of invention the second conductor pin extends through a second dielectric insulator (E) into contact with the face place connector. In another form of invention, a printed circuit board (50) is interposed between the second conductor pin (10') and the connector (H') to establish a predetermined impedance in the RF signal connector.

14 Claims, 4 Drawing Sheets

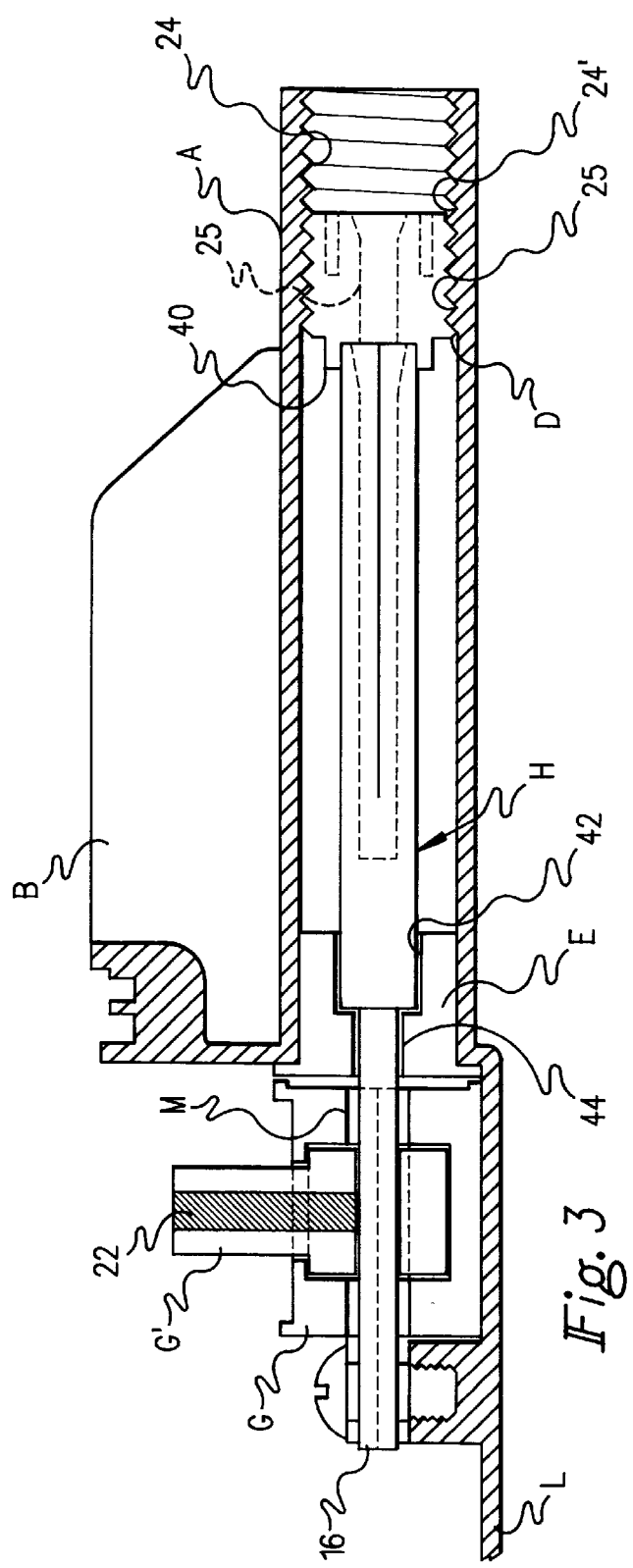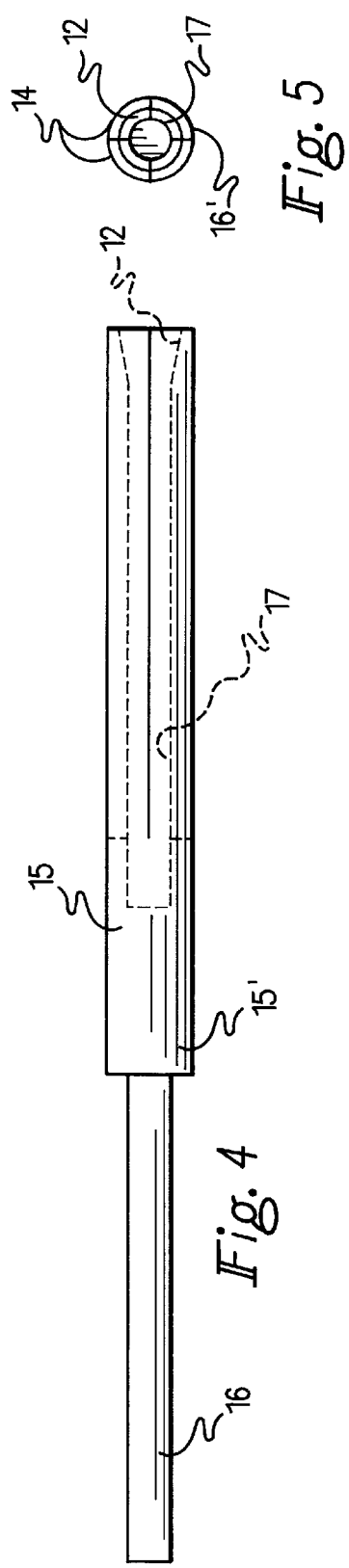

EXTENSION HOUSING FOR RF MULTI-TAP

CROSS REFERENCE TO RELATED APPLICATION

This application claims the benefit of Provisional Patent Application Ser. No. 60/069,149, filed Dec. 9, 1997 for EXTENSION HOUSING FOR RF MULTITAP by Tony Yeh, assigned to the assignee of the present invention.

BACKGROUND AND FIELD OF INVENTION

This invention relates to RF signal distribution devices and more particularly relates to a novel and improved extension housing for multi-taps employed in the field of cable television.

As the traditional cable television providers offer new advanced services throughout the existing network of transmission plants, it is often necessary to upgrade each plant with wider bandwidth subscriber multi-taps. In doing so, it is desirable to replace the electronics and the coaxial connectors but leave the existing coaxial cable in place. The common practice is to cut the existing connectors and the electronics out of the circuit, and then to utilize new subscriber multi-taps of wider bandwidth and a longer "extension" coaxial connector to span the distance between coaxial cable ends.

Extension coaxial connectors typically perform poorly. The additional connector in series adds additional insertion loss into the circuit and the added connection points add increased return loss. Therefore, the entire RF performance of the cascaded multi-tap feeder system is compromised.

Accordingly, there is a need for a multi-tap housing which can be extended in length without affecting RF performance and will keep the signal connector in proximity to the housing in order to achieve RF impedance matching characteristics.

SUMMARY OF THE INVENTION

It is therefore an object of the present invention to provide for a novel and improved multi-tap extension housing for coaxial cable.

It is another object of the present invention to provide for a novel and improved multi-tap extension housing which will optimize RF performance characteristics and facilitate assembly of the connection points while maintaining optimum RF impedance matching throughout the interface.

It is a further object of the present invention to provide a novel and improved RF signal connector adapted for use in a multi-tap extension housing incorporating a circuit board to establish a uniform resistance over a predetermined distance between the RF connector and faceplate connector of the housing.

In accordance with the present invention, a multi-tap housing has been devised which eliminates the need for external extension connectors when rebuilding a traditional broadband transmission plant. The multi-tap housing incorporates a full 9" length from end to end, and features integral coaxial connection points which are designed to minimize insertion loss and maximize return loss characteristics of the circuit; for example, when it is necessary to compensate for the increased spacing between the connecting ends of the TV cable into the multi-tap.

The invention is directed to a die cast housing of extended length which holds an RF signal connector and its dielectric insulator(s). The RF signal connector is comprised of a machined, hollow metal tube having an inward shrinking contact section and an outward expanding section. When a pin-type coaxial connector is inserted into the central axis opening of the RF signal connector, it is first guided by the outward expanding section and then smoothly enters into the radially inward resilient contact section without bias. Excellent contact is achieved by the circular contact surfaces between the cable conductor pin and the equal radius contact section of the signal connector.

In one form, a pair of dielectric insulators are sized to accommodate the signal connector and to keep the signal connector in designed proximity to the grounded housing in order to achieve optimum RF impedance matching throughout the interface, thus optimizing RF performance characteristics. In addition, the insulator closest to the pin connector interface is fashioned as a guide for ease of insertion of the coaxial cable pin connector to the signal connector.

In an alternate but preferred form, a first conductor pin extends from an open end of the housing or tube through a dielectric insulator into the central access opening of the RF signal connector as in the one form above described; however, the opposite end of the RF signal connector is inserted into a slotted end of a printed circuit board. A second conductor pin extends from a slotted portion at the opposite end of the circuit board so as to be in end-to-end relation to the connector body for insertion into the main housing. The circuit board is so constructed and arranged as to establish the desired impedance in the signal connector.

The close tolerances and interfitting relationship between conductive elements of the coaxial cable connector and RF signal connector and housing are critical to the efficient RF transmission performance of the subscriber multi-tap.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 3 is an enlarged view partially in section of the RF signal connector and the dielectric insulators as they are mounted in the cast housing and shown as being upside down in relation to FIG. 2;

FIG. 4 is an enlarged view partially in section of the RF signal connector;

FIG. 5 is an end view of the connector shown in FIG. 4;

DETAILED DESCRIPTION OF PREFERRED EMBODIMENT

Figure 1:
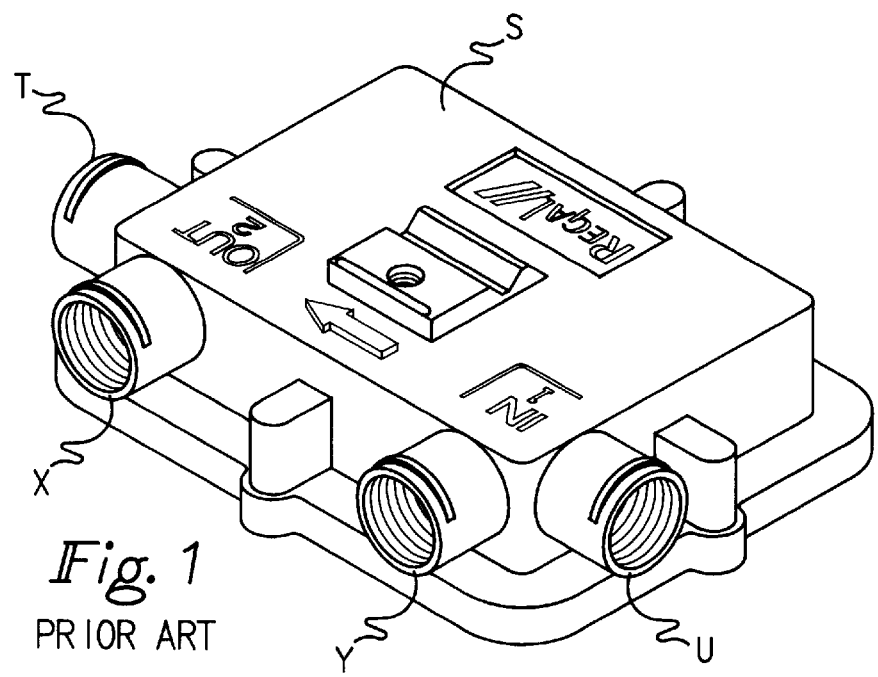
FIG. 1 is a perspective view of a conventional multi-tap housing.
Figure 2:
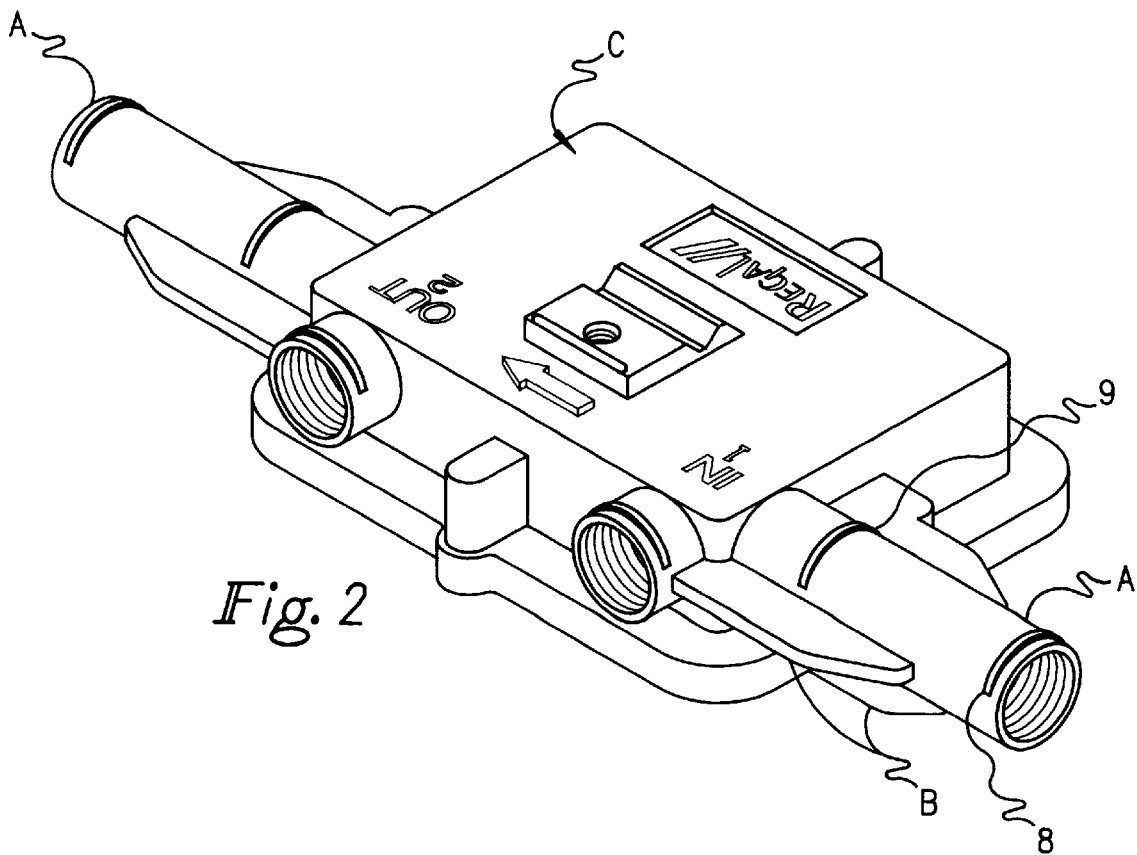
FIG. 2 is a perspective view from the underside of one form of the extension housing illustrating the 9" span from port to port.

There is shown by way of illustrative example in FIG. 1 a conventional multi-tap housing including a main housing S, a first connecting portion T and a second connecting portion U, the connecting portions T and U being tubular and disposed at opposite ends of the housing 1. First and second fixed tubular portions X and Y are mounted on one side of the shell at right angles to the connecting portions T and U, respectively.

Referring in more detail to FIGS. 2 to 6, one form of invention is illustrated wherein an extension housing C spans a distance between coaxial cable ends which will compensate for the increased separation resulting from removal of the existing tap assembly. For example, the extension housing C is on the order of 9" from end to end and is broadly comprised of a main body or housing proper L and spaced coaxial grounded housing ports or tubes A. Each Tube A is provided with a stopping portion 8 and a measuring portion 9. Each of the portions 8 and 9 is raised slightly, the portion 8 assisting in retaining an outer shrink wrap tubing which is customarily placed over the tubing and the coaxial connector as a seal; and the portion 9 serves as a convenient way to measure the correct length of the connector H to be hereinafter described by the installer placing the connector H alongside the exterior of the tube A and cutting off the end of the pin 16 which forms a part of the connector H at the correct length. This will insure that the connector H is inserted the correct distance into the interior of the tube as hereinafter described. In the one form, the housing C is a die cast unit and the tubes A are reinforced by gussets B. Each tube is dimensioned to receive a novel and improved RF signal connector H and two dielectric spacers D and E, although in the following description only one of the RF signal connector assemblies will be described and its manner of assembly into one of the tubes A, it being understood that a corresponding RF signal connector is installed in the other tube A as well.

The tube A is axially aligned with a through-bore M in a housing-to-faceplate connector G mounted in one corner of the body L, the tube A being united to the wall of the housing body L and in open communication with its interior. The outermost spacer D is inserted into the tube A from the interior of the body L prior to mounting of the connector G in place, and the spacer D is screwed into internally threaded portion 23 in the tube A until it abuts an internal shoulder 24' which separates the portion 23 from a second internally threaded portion 24 at the outer end of the tube A.

The RF signal connector H preferably is a solid cylinder 15 having a central bore 17 extending along its greater length with a flared end 12 at its entrance. The wall portion of the cylinder 15 surrounding the bore 17 is split into quadrants in the form of accurate cross-sections by longitudinal slits 16' extending from the flared end 12 through the entire thickness of the wall portion along the substantial length of the bore 17 but terminating just short of the closed end of the bore 17. The signal connector H is inserted into the cast tube A until the flared end 12 of the central bore 17 abuts the spacer D and is axially aligned with its bore 25 by circumferentially spaced fingers 40 at the inner end of the spacer surrounding the bore 25.

Figure 6:
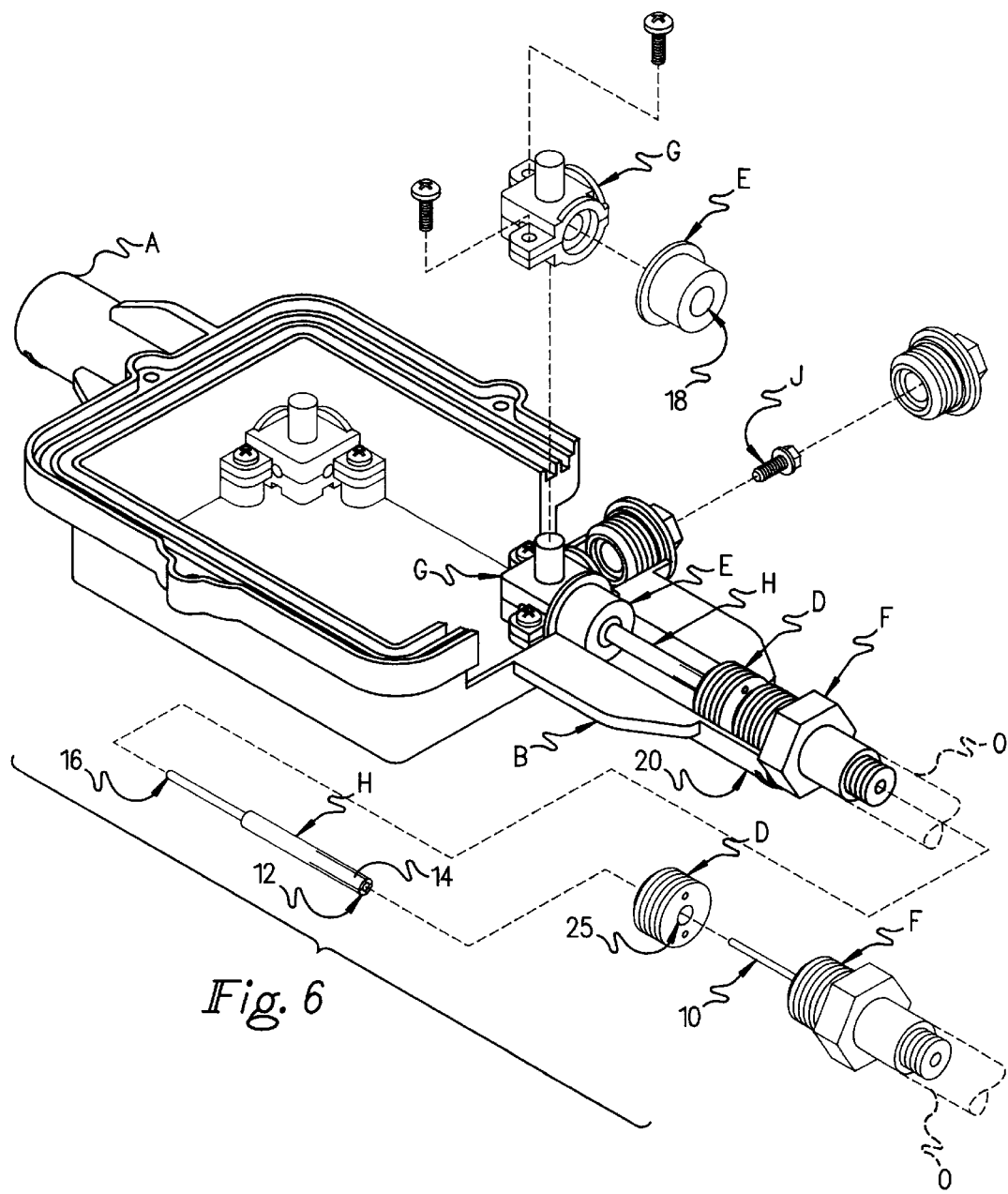
FIG. 6 is a perspective view of the housing that details in assembled and exploded views, the one form of housing to RF faceplate connector, the RF signal connector, and the dielectric insulators.

The signal connector H extends inwardly from the spacer D over the greater length of the tube A, and the innermost spacer E is inserted from the interior of the body L into engagement with the inner closed end of the connector H, the end 15' of the connector being received in a counterbore 42, and a conductor pin 16 at the inner end 15' of the connector H passes through a bore 44 in the spacer E. The faceplate connector G is mounted in place, as shown in FIG. 6, with the conductor pin 16 extending through the bore M in the connector G. The pin 16 may be securely attached to the connector G by various means, such as, by a seizure screw J. In the alternative, as shown in Drawing 3, a solder well 22 can be passed downwardly into a brass male connector G' of the connector G so as to establish electrical contact with the pin 16.

As shown in FIG. 6, a conventional coaxial cable connector F attached to a cable O is threaded into the outer threaded end 24 of the tube A with a conductor pin 10 at the leading end of the connector F advancing through the bore 25 of the spacer D and the flared end 12 of the connector H. The quadrants of the connector H define four contact leaves or prongs 14 which are sized to snugly receive and fit against circumferentially spaced, adjacent surfaces of the pin 10. The flared entrance 12 facilitates entry of the pin 10 into the bore 17, and the leaves 14 are free to spring slightly apart to accommodate insertion of the pin 10 into the connector H.

Again, the assembly as hereinabove described is duplicated at the opposite end of the extension housing to result in vastly improved performance in the entire multi-tap device and in such a way as to minimize insertion losses and maximize return losses. The gussets or fins B rigidify the mounting of the tubes A with the wall of the body L and maintain coaxial alignment between the conductive elements. When the cable is to be connected, the stopping portions 8 are used as the basic standard for the bare length of the conducting line inside the cable.

Figure 7:
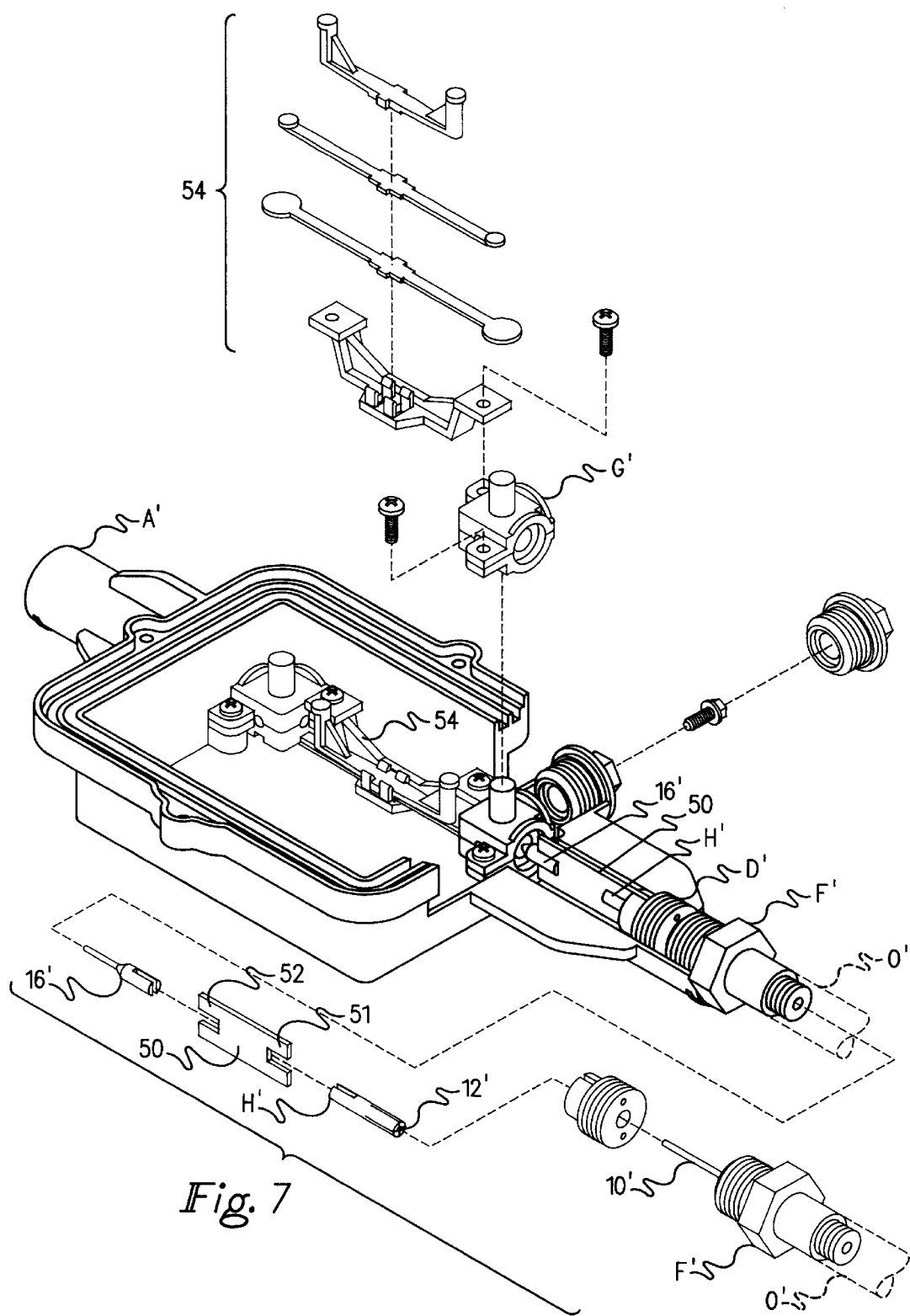
FIG. 7 is a perspective view of an alternate preferred form of housing with portions thereof shown in exploded form.

In an alternate but preferred form of invention as illustrated in FIG. 7 attached to a cable O', a conductor pin 10' extends from the end of the connector F' at the open end of the tube A' and is connected into the RF signal connector H' as in the form of FIGS. 1–4. However, the connector H' and its conductor pin 16' are soldered to opposite slotted ends 51 and 52 of a circuit board 50. The circuit board 50 establishes a precise distance between the connector H' and ground and is composed of a fiberboard material, such as, Chem 3, covered with a copper film to maintain a uniform 75 ohm impedance through a 4.5" gap. A common conductor member which may suitably take the form of a standard power bus 54 extends between the internal face plate connectors G'. Although not illustrated in FIG. 6, an identical type of common conductor to that of the power bus 54 in FIG. 7 extends between the internal face plate connectors G.

It is therefore to be understood that while preferred and modified forms of invention are herein set forth and described, the above and other modifications and changes may be made therein without departing from the spirit and scope of the present invention as defined by the appended claims and reasonable equivalents thereof.

I claim:

1. In a cable TV multi-tap device having a main housing including a common conductor member and extension tubes extending from opposite ends of said main housing, said extension tubes terminating in cable connectors, the improvement comprising:

an RF signal connector in each of said extension tubes having a dielectric insulator at one end thereof, an elongated conductor portion having a central bore and a wall surrounding said bore divided into longitudinally split segments along a greater length of said bore, said bore aligned with a central opening in said insulator, a first conductor pin extending from each of said cable connectors and inserted through said insulator into said bore;

a second conductor pin at an opposite end of said conductor member from said first conductor pin and extending into contact with said common conductor member; and a printed circuit board coupling said first conductor pin in end-to-end relation to said second conductor pin including means establishing a predetermined resistance between said first and second conductor pins.

2. A device according to claim 1 wherein said split segments are defined by resilient contact leaves.

3. A device according to claim 1 wherein internal connectors are mounted in said housing for connection of each of said pins thereto.

4. A device according to claim 3 wherein said internal connectors are mounted internally at opposite ends of said housing.

5. A device according to claim 1 wherein said extension tubes are integral with said opposite ends of said housing.

6. A device according to claim 5 wherein reinforcing gussets are mounted between said extension tubes and said housing.

7. In a multi-tap device according to claim 1 wherein each said extension tube includes an external measuring portion and an external stopping portion in predetermined spaced relation to one another.

8. In a cable TV multi-tap device having a housing and spaced coaxial extension tubes at opposite ends of said housing in coaxially aligned relation to one another, the improvement comprising:

an RF signal connector in each said tube having first and second dielectric spacers at opposite ends of said tube, an elongated conductor member having a central bore and a wall portion surrounding said bore divided into longitudinally split segments along a greater length of said bore, said bore aligned with a central opening in said first of said spacers;

a first conductor pin inserted through said first of said spacers and into said bore;

a second conductor pin at an opposite end of said connecting portion inserted through an opening in said second of said spacers; and a circuit board coupling said first conductor pin in an end-to-end relation to said second conductor pin including means establishing a predetermined impedance between said first and second conductor pins.

9. In a device according to claim 8 wherein said split segments are defined by resilient contact leaves having arcuate cross-sections.

10. In a device according to claim 8 wherein internal connectors are mounted in said housing for connection of each of said second conductor pins thereto.

11. In a device according to claim 10 wherein said internal connectors are mounted internally at opposite ends of said housing.

12. In a device according to claim 8 wherein each of said extension tubes includes an external measuring portion and an external stopping portion in predetermined spaced relation to one another.

13. In a device according to claim 12 wherein reinforcing gussets are mounted between said extension tubes and said housing.

14. In a device according to claim 8 wherein said circuit board is provided with notched end portions for connection of said first and second conductor pins to said circuit board.

* * * * *